United States Patent [19]

Sommer

[11] Patent Number: 5,194,057
[45] Date of Patent: Mar. 16, 1993

[54] TWO SPEED PRESS DRIVE

[75] Inventor: Gordon M. Sommer, Grosse Pointe Farms, Mich.

[73] Assignee: Sommer Company, Warren, Mich.

[21] Appl. No.: 825,550

[22] Filed: Jan. 24, 1992

[51] Int. Cl.[5] .......................................... F16D 67/04
[52] U.S. Cl. .............................. 475/339; 192/18 A; 192/87.16; 74/665 B
[58] Field of Search .............. 192/87.16, 12 R, 18 A, 192/48.91; 475/339; 74/665 B; 82/142

[56] References Cited

U.S. PATENT DOCUMENTS

| | | | |
|---|---|---|---|
| 2,441,543 | 5/1948 | Longfield | 192/18 A |
| 2,922,314 | 1/1960 | Johnson et al. | 192/18 A |
| 3,089,574 | 5/1963 | Howard | 192/48.1 |
| 3,494,450 | 2/1970 | Mankowsky et al. | 192/18 A |
| 3,614,999 | 10/1971 | Sommer | 192/18 A |
| 3,696,898 | 10/1972 | Sommer | 192/18 A |
| 3,713,517 | 1/1973 | Sommer | 192/18 A |
| 4,135,611 | 1/1979 | Spanke | 192/18 A |
| 4,183,425 | 1/1980 | Sommer | 192/113 B |
| 4,186,626 | 2/1980 | Chamberlain | 475/331 X |
| 4,186,827 | 2/1980 | Spanke | 192/18 A |
| 4,296,650 | 10/1981 | Kalns | 192/18 A X |
| 4,407,399 | 10/1983 | Wolff | 192/18 A X |
| 4,432,443 | 2/1984 | Sommer | 192/12 R |
| 4,532,827 | 8/1985 | Beim | 192/18 A X |
| 4,552,255 | 11/1985 | Sommer | 192/18 A |
| 4,562,903 | 1/1986 | Rogier | 475/331 X |
| 4,577,738 | 3/1986 | Yater | 192/18 A |
| 4,598,804 | 7/1986 | Sommer | 192/0.02 R |
| 4,607,736 | 8/1986 | Kelley | 192/18 A |
| 4,616,739 | 10/1986 | Sommer | 192/18 A |
| 4,644,819 | 2/1987 | Zugel | 74/665 B |
| 4,693,350 | 9/1987 | Sommer | 192/18 A |
| 4,921,078 | 5/1990 | Sommer | 188/171 |

Primary Examiner—Richard M. Lorence
Assistant Examiner—Khoi Q. Ta
Attorney, Agent, or Firm—Harness, Dickey & Pierce

[57] ABSTRACT

A two speed press drive using hydraulic actuated oil shear clutch/brake units is disclosed. The clutch/brake units for selecting high or low speed are in coaxial nested relationship to each other. The speed change is achieved using a planetary gear set in which all members of the planetary gear set are allowed to float thus providing exact tooth meshing for all components. The drive provides a more precise operation due to no wear of clutch plates and less heat generation in the clutch/brake units. The gearing and bearings for the unit are contained in a sealed chamber which is continuously supplied with oil which has been filtered and cooled.

9 Claims, 4 Drawing Sheets

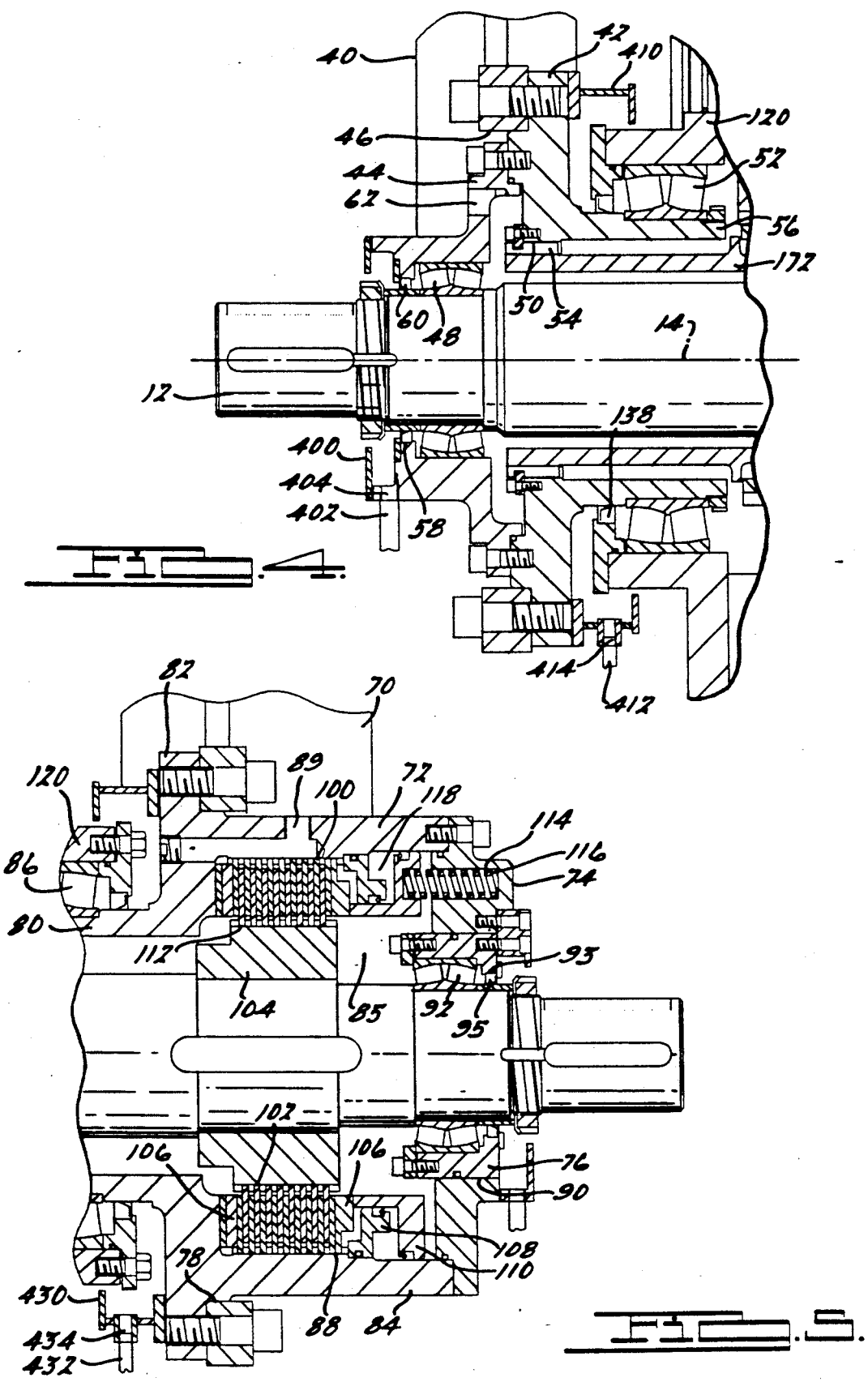

TWO SPEED PRESS DRIVE

BACKGROUND OF THE INVENTION

The present invention relates to press drives. More particularly, the present invention relates to a two speed press drive for a double action press.

Two speed press drives are known in the art but most of these two speed drives have problems with the brake and clutch systems, the planetary gearing and the overall lubrication of the bearing and gearing.

The brake and clutch systems use a plurality of dry clutch plates. The continued operation of these dry plates against each other cause wear and heat generation. Due to the wear of these elements, the press requires constant adjustment and replacement of these components. The generation of heat when combined with the excessive wear of these plates causes the brake or clutch system to fade. This brake and clutch fading adversely effect the operation and up-time of the press.

The planetary gear arrangement in these two speed press drives leads to excessive wear and increased downtime due to the rigid mounting of either or both of the ring and sun gear. Experience has shown that elements of large, high-powered planetary gear sets are adversely effected if any one of these elements are rigidly mounted. The rigid mounting of one element leads to unequal sharing of load between the mating elements. This in combination with the requirement that the planetary gearing not only starts and stops but also reverses direction during the press cycle leads to increased wear and downtime.

In addition to the problems listed above for the brake, clutches and planetary gear arrangements, the two speed drives also have the problem of poor lubrication of both gears and bearings. This inadequate lubrication of the components leads again to excessive wear and increased downtime.

Accordingly what is needed is a two speed drive system which eliminates the problems associated with dry clutches and improperly mounted planetary gears. In addition, an improved lubrication system is required to adequately provide lubrication to the moving components of the assembly.

SUMMARY OF THE INVENTION

The present invention provides the art with a two speed drive system which utilizes oil shear brakes and clutches. In an oil shear clutch/brake drive, over 90% of the start-stop inertia is absorbed by a thin, but positive oil film between the plates. This thin oil film results in little or no wear of the plates in the brakes and clutches and no brake fade. Therefore, a more precise press operation is achieved which dramatically increases the press's up-time. The thin oil film carries away the heat generated during the stop-start cycles of the press. This removal of generated heat from the disk members means there is no practical limit in the press trip rate and flywheel speed. Unlimited and precise inching capabilities of the press are now provided.

Another advantage of the present invention is the full floating of the planetary gear elements. This is accomplished by using a splined torque tube to ground the sun gear of the planetary gear set thus providing the necessary float for proper load shaping of the planet gears. The planet gears are provided with a bushing at the far end allowing these elements to also have the pre-requisite float. The full floating of both of these elements and the use of only three planet gear assemblies assures positive alignment of the gear meshes. In addition, the planetary gear set operates continuously when the flywheel is rotating eliminating the problems with starting, stopping and reversing the planetary gearing.

The lubrication of the gearing and bearings is automatically solved because the drive housing runs completely full of oil. The planet pins are drilled to assure their bearings get proper lubrication.

DESCRIPTION OF THE DRAWINGS

Further objects, features and advantages of the present invention will become apparent from the analysis of the following written specification, the accompanying drawings and the appended claims in which:

FIG. 4 is a side view partially in cross section of an enlarged view of the first support member area of the present invention.

FIG. 5 is a side view partially in cross section of an enlarged view of the second support member area of the present invention.

DETAILED DESCRIPTION OF THE INVENTION

Figure 1:
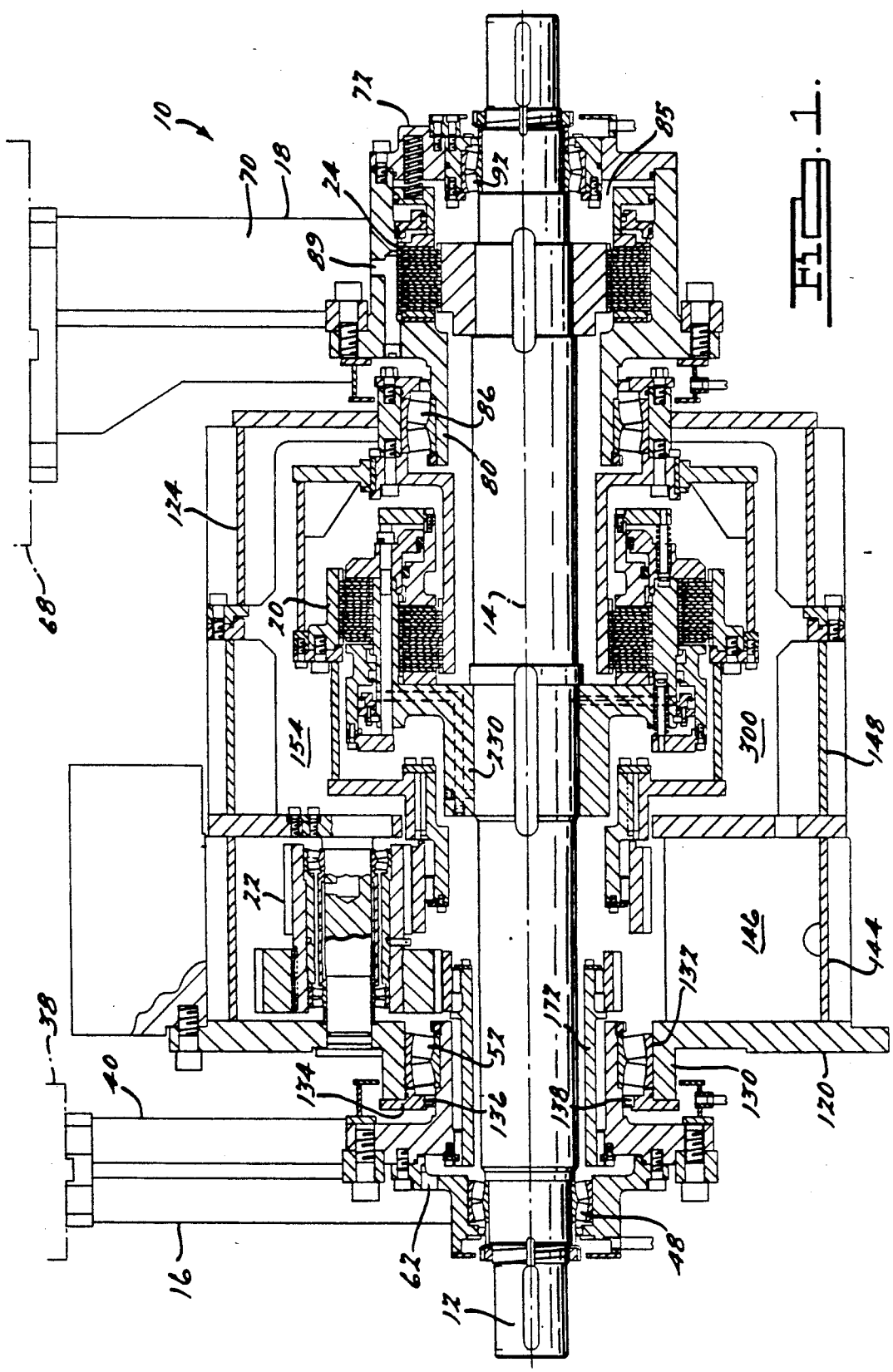
FIG. 1 is a side view partially in cross section of a two speed press drive in accordance with the present invention.

Generally speaking, the two speed drive unit of the present invention is adapted to find particularly useful application in the connection with the flywheel or a similar rotatable member of a double action metal forming or stamping press or the like. Although the invention will find varied use in many types of applications, due to the especially useful application of the invention with a typical rotary flywheel, the present invention is shown and described, by way of example, in operative association therewith.

Referring now to the drawings, a two speed drive unit 10, in accordance with the present invention is shown as comprising an axial drive shaft 12 rotatable about a center axis 14, a first support member 16, a second support member 18, a brake/clutch unit 20, a planetary gear assembly 22, and a drive shaft brake 24.

Drive shaft 12 is rotatably positioned at one end by first support member 16 and rotatably positioned at the opposite end by a second support member 18. First support member 16 is comprised of support base 40, a first bearing cap 42 and a second bearing cap 44. Support base 40 is adapted to be fixedly secured to an associated non-rotatable support structure, generally shown in phantom and designated by the reference numeral 38. The first support member 40 has a circular hole 46 which is generally coaxial with the center axis 14.

Fixedly positioned in the circular hole 46 is the first bearing cap 42. The first bearing cap 42 has a circular hole 50 which is generally coaxial with the center axis 14. The interior surface of the circular hole comprises a first spline means 54 which is used to support annular sun gear 172 as will be explained later herein. Connected to the first bearing cap 42 and located adjacent to the circular hole 50 is cylindrical housing 56. The inside diameter of the cylindrical housing 56 is slightly larger than and is coaxial with the diameter of circular hole 50. The exterior surface of the cylindrical housing 56 is adapted for mounting a bearing 52 which is used to rotatably mount a planetary gear carrier 120 of the planetary gear set 22.

Fixedly and sealably attached to the first bearing cap 42 is second bearing cap 44 which is adapted to rotatably mount the drive shaft 12 to the first support member 16 by bearing 48. The second bearing cap 44 also provides a cylindrical surface 58 for locating a seal 60 exterior to bearing 48. The seal 60 is held stationary in the second bearing cap 44 and rides against the driveshaft 12. Second bearing cap 44 further has an axially extending oil passage 62 for circulating cooling and lubrication oil as will be described later herein.

Second support member 18 is comprised of support base 70, brake support housing 72, end cap 74 and bearing mount 76. Support base 70 is adapted to be fixedly secured to an associated non-rotatable support structure, generally shown in phantom and designated by the reference numeral 68. Second support member 18 has a circular hole 78 which is generally coaxial with the center axis 14.

Fixedly positioned in the circular hole 78 is brake support housing 72 which comprises annular section 80, flange section 82 and annular section 84. Both annular sections 80 and 84 are aligned generally coaxial with the center axis 14. Annular section 80 is generally parallel to the center axis 14 and is adapted on one end to locate bearing 86 which cooperates with bearing 52 to position the planetary gear carriage 120 generally coaxial with the center axis 14. Flange section 82 is integral with and radially extends from the end of the annular section opposite the end which mounts the bearing 86. Flange section 82 is adapted to fixedly attach the brake support housing 72 to the support base 70. Annular section 84 is integral with and extends axially from flange section 82. The interior surface 88 of annular section 84 forms chamber 85 and is adapted to mount a plurality of fixed brake disks 100. Annular section 84 further has a radially extending oil passage 89 for circulating cooling and lubricating oil as will be described later herein.

End cap 74 is fixedly and sealingly attached to the end of annular section 84 opposite the flange section 82. The end cap has a circular opening 90 which is generally coaxial with the center axis 14 and a plurality of circumferentially spaced spring bores 114 which are at a greater radial distance from center axis 14 than the diameter of circular opening 90. Fixedly and sealingly mounted within the cylindrical opening 90 is bearing mount 76. Bearing mount 76 positions bearing 92 which rotatably mounts the drive shaft 12 with respect to second support member 18. Thus, the input shaft 12 is rotatably mounted on center axis 14 between first support member 16 and second support member 18 by bearings 48 and 92. Bearing mount 76 also provides surface 93 for mounting of seal 95. Seal 95 is stationary in bearing mount 76 and rides against output shaft 26.

The drive shaft brake 24 is comprised of the plurality of fixed brake disks 100, a plurality of rotating brake disks 102, annular drive ring 104, a pair of brake reaction rings 106, annular ring 108, and actuation ring 110. The annular drive ring 104 is fixedly mounted to drive shaft 12 and has an exterior surface 112 which is adapted to mount the plurality of rotating brake disks 102. The rotating brake disks 102 are mounted to the exterior surface 112 of the annular drive ring 104 such that they rotate with the drive shaft 12 but they are free to move axially along drive axis 14. Disposed interjacent or interleaved between the plurality of rotating disk plates 102 is the plurality of fixed disk brakes 100. The plurality of fixed disk brakes 100 are mounted to the interior surface 88 of annular section 84 such that they are unable to rotate but are capable of moving axially along the center axis 14.

Located on either side of the disk plates 100 and 102 are the brake reaction rings 106. One brake reaction ring is position to abut one side of flange section 82 of brake support housing 72. The other brake reaction ring 106 is located between the disk plates 100 and 102 and the end cap 74. The annular ring 108 is located between the brake reaction ring 106 and the end cap 74 such that it is fixedly and sealingly engaged with the interior surface 88 of annular section 84. Interposed between the annular ring 108 and the end cap 74 is actuation ring 110 which is slidably and sealingly engaged with both annular ring 108 and the interior surface 88 of annular section 84. A sealed chamber 118 is thus formed between actuation ring 110, annular ring 108 and inner surface 88.

A plurality of coil springs 116 are located in the plurality of spring bores 114 such that actuation ring 110 is biased to the left as shown in FIG. 1, whereby the actuation ring 110 will exert a leftwardly directed force against the plurality of brake disks 100 and 102 with the result that the disks 100 and 102 and reaction rings 106 will be compressed between actuation ring 110 and flange section 82 of brake support housing 72. This force thus exerts an effective braking action against the drive shaft 18. At such a time as it is desired to rotate the drive shaft 18, the braking action is relieved by pressurizing chamber 118 such that the pressure against actuation ring 110 exceeds the spring force of coil springs 116. This removes the force compressing the brake disks 100 and 102 and allows them to rotate with respect to each other thus allowing for rotation of drive shaft 18.

Planetary gear assembly 22 comprises the planetary gear carriage 120 and the planetary gear set 128. As described above the planetary gear carriages 120 is rotatably mounted on the first support member 16 and the second support member 18 by bearings 52 and 86. The planetary gear carriage 120 comprises housing 122, support member 124 and clutch/brake reaction ring 126. The housing 122 has a cylindrical flange 130 which is coaxial with central axis 14 and provides a mounting surface 132 for bearing 52. Carriage end plate 134 is fixedly and sealingly mounted to the end of cylindrical flange 130 and provides mounting surface 136 for seal 138. Seal 138 rotates with housing 122 and rides against first support member 16.

The housing 122 further has a first circular plate 138 radially extend from the cylindrical flange 130 for mounting both the planetary gears 170 and the flywheel 140. A second circular plate 142 is spaced from and is generally parallel to circular plate 138. A first cylindrical wall 144, coaxial with the center axis 14 attaches the first circular plate to the second circular plate 142 and forms chamber 146. A second cylindrical wall 148 coaxial with the central axis 14 extends from the second circular plate 142 in the direction opposite to the first cylindrical wall 144.

The support member 124 is a cup shaped member having a cylindrical wall section 150 and a circular plate 152 integral with cylindrical wall section 150. The cylindrical wall section 150 is fixedly and sealingly attached to the cylindrical wall 148 of the housing 122 forming chamber 154. The opposite end of the cup support member 124 terminates at cylindrical ring 156 which is adapted to mount bearing 86 for planetary gear carriage 120. Fixedly and sealingly attached to the outer end of cylindrical ring 156 is carriage end plate 158 which provides mounting surface 160 for seal 162. Seal 162 rotates with support member 124 and rides against the second support member 18.

The clutch/brake reaction ring 126 is fixedly attached to the other end of cylindrical ring 156 and extends into chamber 154. The outside surface 164 of the reaction ring 126 has a spline means 166 for mounting a first plurality of friction plates 242. The first plurality of friction plates 242 are mounted to the reaction ring 126 such that they rotate with reaction ring 126 but are free to travel axially along the spline means 166. Additionally, the exterior surface 127 opposite the spline means 166 is adapted to support clutch/brake guide member 178.

The planetary gear set 128 comprises three planetary gears 170, annular sun gear 172, annular reaction gear 174, clutch/brake reaction member 176 and guide member 178. Each planetary gear 170 comprise mounting pin 180, inner gear 182 and outer gear 184. The mounting pin 180 is fixedly mounted to both circular plates 138 and 142 and extend across chamber 146 for mounting the inner gear 182. The mounting pin 180 has oil passage 181 for lubricating the inner gear 182 for rotation on mounting pin 180. The inner gear 182 is rotatably mounted to mounting pin 180 by a pair of bearings 186. The exterior surface of inner gear 182 has gear teeth 190 and spline teeth 192. Fixedly engaged with the spline teeth 192 is outer gear 184.

The annular sun gear 172 is meshed with the outer gear 184 at one end and is engaged in first spline means 54 of the first bearing cap 42 at the opposite end. Sun gear 172 is therefore held stationary by the engagement with the spline means 54 which anchors the sun gear 172 to the first support member 16.

The exterior teeth 194 of annular reaction gear 174 are in mesh with the gear teeth 190 of the planetary gear 170. The interior surface 196 of annular gear 174 has a spline means 198 for engagement with the clutch/brake member 176.

Figure 2:
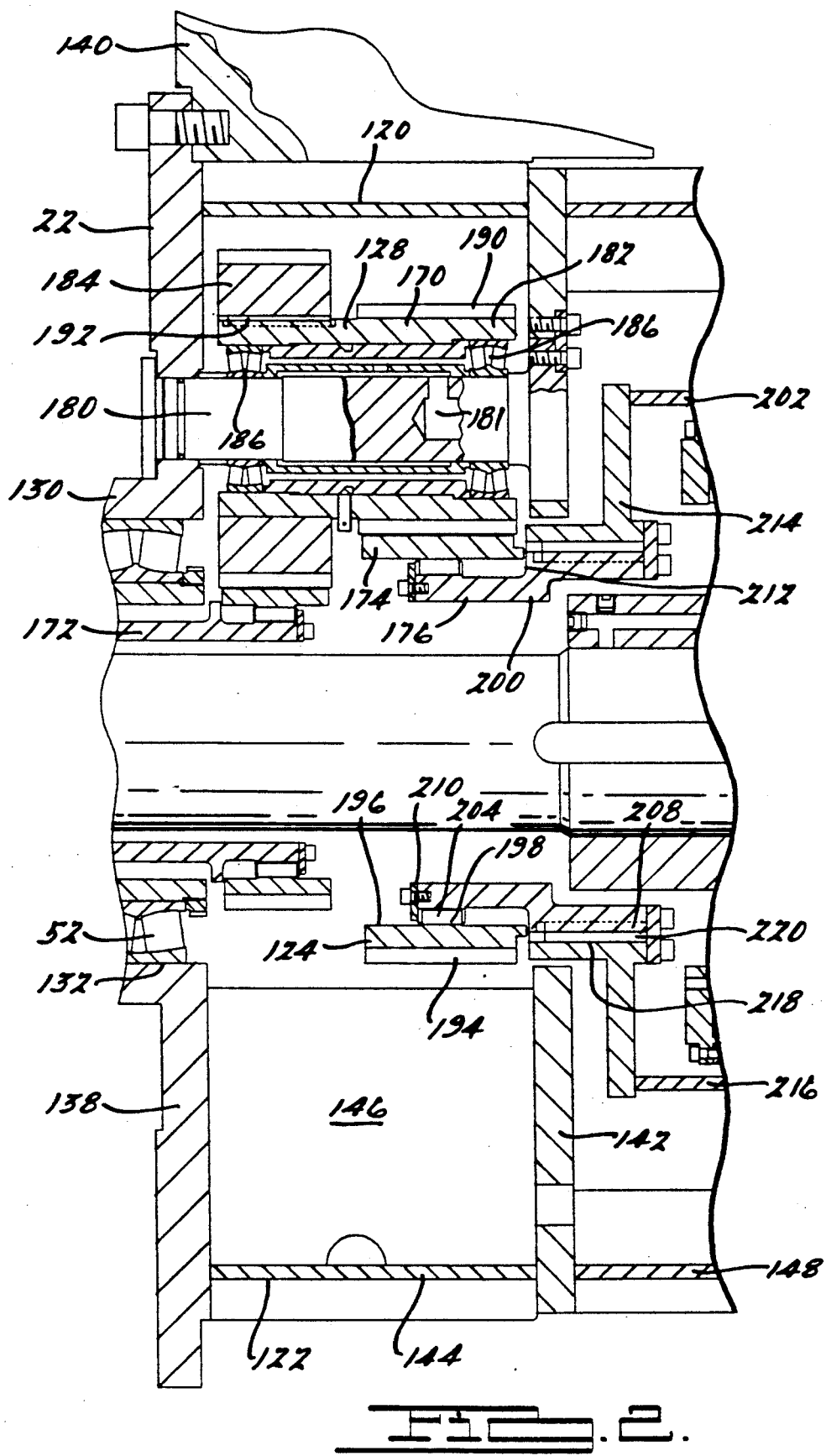
FIG. 2 is a side view partially in cross section of an enlarged view of the planetary gear assembly area of the present invention.

The clutch/brake reaction member 176 comprises annular ring 200 and cylindrical reaction arm 202. The annular ring 200 has a spline means 204 on one side of its external surface for engagement with the spline means 198 of the reaction gear 174. The opposite end of the annular ring 200 has a spline means 208 for engagement with cylindrical reaction arm 202. Reaction gear 174 is held in place by annular stop 210 which is fixedly attached to annular ring 200 and by abutment to surface 212 of annular ring 200 as shown in FIG. 2.

The cylindrical reaction arm 202 has circular plate 214 and cylindrical ring 216. Circular pate 214 defines interior surface 218 which has spline means 220 formed into it for engagement of spline means 208 of annular ring 200. The cylindrical ring 216 is integral with and extends axially from the outside of circular plate 214 and is adapted on its interior surface 222 for engagement with a fourth plurality of friction plates 248. The fourth plurality of friction plates 248 are mounted to the cylindrical ring 216 such that they rotate with the cylindrical ring 216 but are free to travel axially along the interior surface 222. The guide member 178 is fixedly attached at one end to the cylindrical ring 216 by annular ring 224 which is fixedly attached to both cylindrical ring 216 and annular ring 224. The opposite end of the guide member 178 has a circular plate 226 which extends radially inward and abuts the external surface 127 of the clutch/brake reaction ring 126. A bushing 219 is provided between the guide member 178 and the clutch/brake reaction ring 126 to accommodate the relative movement between the two.

The brake/clutch unit 20 is comprised of the mounting frame 230, first engagement member 232, second engagement member 234, first end plate 236, annular seal ring 240, first plurality of friction plates 242, second plurality of friction plates 244, third plurality of friction plates 246 and fourth plurality of friction plates 248. The mounting frame 230 is comprised of a first annular ring 252, circular plate 254, and second annular ring 256. The first annular ring 252 is fixedly attached to driveshaft 12. The circular plate 254 is integral with and extends radially out from the first annular ring 252. The second annular ring 256 is integral with and extends axially from the outside of circular plate 254. The inside surface 258 is adapted to mount the second plurality of friction plates 244 and the outside surface 260 is adapted to mount the third plurality of friction plates 246. Both the second and third plurality of friction plates 244 and 246 are mounted such that they rotate with the mounting frame 230 but are free to travel axially along the second annular ring 256 of the mounting frame 230. Each side of the annular ring 256 further has a plurality of circumferentially spaced spring bores 282.

The first and second plurality of friction disks 242 and 244 form high speed clutch 245 and are interjacent or interleaved with respect to each other with the first plurality of disks 242 mounted to rotate with the planetary gear carriage 120 and the second plurality of friction disks 244 mounted to rotate with the drive shaft 12. The third and fourth plurality of friction disks 246 and 248 form low speed clutch 249 and are interjacent or interleaved with respect to each other with the third plurality of disks 246 mounted to rotate with the driveshaft 12 and the fourth plurality of disks 248 mounted to rotate with the clutch/brake reaction arm 176.

The first end plate 236 is fixedly attached to the end of the second annular ring 256 opposite the circular plate 254. First end plate 236 has a radially inwardly extending flange 260 which encloses the first and second plurality of friction disks between first end plate 236 and circular plate 254. First end plate 236 also has a radially outwardly extending flange 262 which extends adjacent to the third and fourth plurality of friction disks.

The first engagement member 232 is comprised of annular engagement cylinder 264 and end plate 266. Annular engagement cylinder 264 is sealingly positioned around and in sliding engagement with the second annular ring 256 of the mounting frame 230 such that the third and fourth plurality of friction plates 246 and 248 are disposed between the annular engagement cylinder 264 and the outwardly extending flange 262 of the first end plate 236. The end plate 266 is fixedly attached to the engagement cylinder 264 and extends radially inward. The second engagement member 234 is comprised of annular engagement cylinder 268 and end plate 270. The annular engagement cylinder 268 is disposed between the first and second plurality of friction plates 242 and 244 and the inwardly extending flange 260 of the first end plate 236. The second engagement member 234 is sealingly and slidably engaged with the first end plate 236 and the inwardly extending flange 260 of the first end plate 236. The end plate 270 is fixedly attached to the end of the annular engagement cylinder 268 and extends radially outward outside of first end plate 236. The end plate 266 is fixedly attached to the end plate 270 such that the end plates 266 and 270 move axially as a unit by a plurality of spacer rods 272. Spacer rods 272 extend through a plurality of circumferentially spaced cylindrical holes 274 which extend completely through second annular ring 256 of the mounting frame 230. Spacer rods 272 are free to move axially within the hole 274.

Disposed between first engagement means 232 and end plate 266 is annular seal ring 240 which is fixedly and sealingly attached to the mounting frame 230 by mounting ring 276. Annular seal ring 240 is also in sliding and sealing engagement with the annular engagement cylinder 264 of the first engagement member 232.

Figure 3:
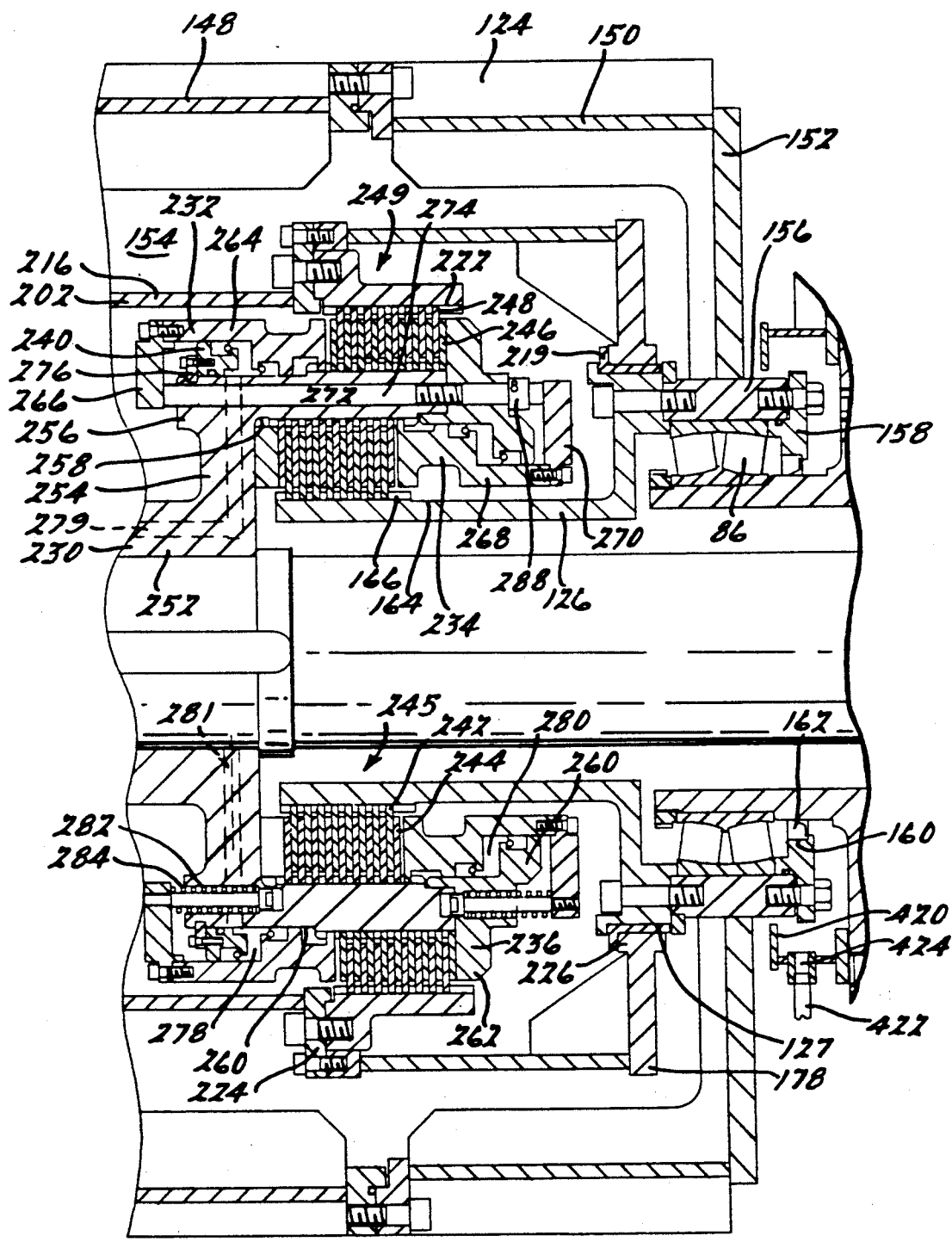
FIG. 3 is a side view partially in cross section of an enlarged view of the brake/clutch unit area of the present invention.

The first engagement member 232, the annular seal ring 240 and the mounting frame 230 form a first sealed chamber 278. The second engagement member 234 and the first end plate 236 form a second sealed chamber 280. The sealed chambers 278 and 280 engage and release the high speed and low speed clutches 245 and 249 as will be described later herein. Access for pressurizing sealed chamber 278 and 280 is provided by passages 279 and 281 respectively. The oil passages 279 and 281 are channeled through mounting frame 230 as shown in FIGS. 1 and 3. Mating oil passages (not shown) are provided axially in driveshaft 12 to connect with rotary couplings (not shown) on either or both ends of driveshaft 12. The exact routing of these passages through driveshaft 12 is determined by individual press design.

A plurality of coil springs 284 are disposed within the spring bores 282. The coil springs react between the mounting frame 230 and both the end plates 266 and 270 and are adjusted by adjustment means 288.

Chamber 85, chamber 146 and chamber 154 cooperate with each other to form sealed cavity 300. Sealed cavity 300 is sealed by seal 60, seal 95, seal 138 and seal 162. Both oil passages 62 and 89 are connected to and cooperate with sealed cavity 300. By connecting the oil passages 62 and 89 to an oil pump (not shown), a reservoir (not shown), and cooling coils (not shown) a continuous supply of lubricating and cooling oil can be provided to two speed drive unit 10.

Oil dam 400 is provided on second bearing cap 44 to accumulate the oil which leaks past seal 60. Oil tube 402 is provided at outlet 404 for returning the accumulated oil to the reservoir (not shown).

Oil dam 410 is provided on first bearing cap 42 to accumulate the oil which leaks past seal 138. Oil tube 412 is provided at outlet 414 for returning accumulated oil to the reservoir (not shown).

Oil dam 420 is provided on brake support housing 72 to accumulate the oil which leaks past seal 162. Oil tube 422 is provided at outlet 424 for returning accumulated oil to the reservoir (not shown).

Oil dam 430 is provided on end cap 74 to accumulate the oil which leaks past seal 95. Oil tube 432 is provided at outlet 434 for returning accumulated oil to the reservoir (not shown).

The operation of the cycle begins with the planetary gear carriage 120 of the planetary gear assembly 22 rotating at a specified speed. The driveshaft brake 24 is in the applied condition prohibiting the axial driveshaft 12 from rotating. The brake/clutch unit 20 is in a neutral position balanced by the plurality of coil springs 284 such that neither the high speed clutch 245 nor the low speed clutch 249 is in the engaged condition.

When the press begins its cycle driveshaft brake 24 is released and pressure is supplied to sealed chamber 280 in sufficient quantity to overcome the biasing load of coil springs 284 and engage the high speed clutch 245 locking the axial driveshaft 12 to the planetary gear carriage 120. The driveshaft 12 therefore rotates at the same speed as the planetary gear carriage 120.

The high speed operation continues until the low speed limit switch (not shown) is tripped. When this occurs, pressure to sealed chamber 280 is released and pressure is supplied to sealed chamber 278 in sufficient quantity to overcome the biasing load of coil springs 284 thus releasing high speed clutch 245 and engaging low speed clutch 249 locking the axial driveshaft 12 to the clutch/brake reaction member 176. The driveshaft 12 therefore rotates at a reduced speed. The reduction of speed is determined by the gear ratios employed in the planetary gear set 128 as detailed above.

The low speed operation continues until the high speed limit switch (not shown) is tripped. When this occurs, the pressure is released from sealed chamber 278 and supplied again to sealed chamber 280 releasing the low speed clutch 249 and engaging the high speed clutch 245 and operation of the press continues as described above.

At the completion of the cycle, pressure is released from sealed chamber 280 thus releasing the high speed clutch 245. The clutch/brake unit 20 returns to its neutral position due to the balancing of loads from coil springs 284. The driveshaft brake 24 is reapplied and the axial driveshaft comes to a stop.

While the above detailed description describes the preferred embodiment of the present invention, it should be understood that the present invention is susceptible to modification, variation and alteration without deviating from the scope and fair meaning of the subjoined claims.

What is claimed is:

1. A two speed drive for an apparatus comprising:
   a stationary support means for mounting said two speed drive;
   input drive means for transmitting rotational movement into said two speed drive, said input drive means rotatably mounted on said stationary support means;
   output drive means for transmitting rotational movement from said two speed drive, said output drive means rotatably mounted in said stationary support means;
   planetary gear means for providing speed reduction between said input drive means and said output drive means;
   selectively operable first clutch means for locking said output drive means to said input drive means;
   selectively operable second clutch means for locking said output drive means to said planetary gear means; said first clutch means mounted inwardly of and in coaxial nested relation to said second clutch means;
   first engagement means for engaging said first clutch means, said first engagement means including first spring means for urging said first clutch means into an engaged condition and locking said output drive means to said input drive means;

second engagement means for engaging said second clutch means, said second engagement means including second spring means for urging said second clutch means into an engaged condition and locking said output shaft to said planetary gear means;

actuating means connecting said first and second engagement means together such that said first spring means cooperates with said second spring means to disengage both of said first and second clutch means; said actuating means operable such that when said first engagement means engages said first clutch means said second engagement means releases said second clutch means wherein rotation is transmitted from said input means to said output means, and when said second engagement means engages said second clutch means, said first engagement means releases said first clutch means wherein rotation is transmitted from said planetary gear means to said output means;

selectively operable brake means for prohibiting rotation of said output drive means in relation to said stationary support means;

third means for engaging said brake means, said third engagement means including third spring means for urging said brake means into an applied condition to prohibit rotation of said output drive means.

2. The two speed drive of claim 1 wherein said planetary gear means comprises:

a first sun gear fixedly attached to said stationary support means;

a plurality of planet gears rotatably mounted to a carrier, said planet gears meshed with said first sun gear, said carrier fixedly attached to said input drive means; and a second sun gear meshed with said plurality of planet gears for transmitting rotational movement to said output drive means.

3. The two speed drive of claim 1 wherein said first clutch means comprises a plurality of interleaved friction disks alternately splined, respectively, to said output drive means and said input drive means.

4. The two speed drive of claim 1 wherein said second clutch means comprises a plurality of interleaved friction disks alternately splined, respectively, to said planetary gear means and said output means.

5. The two speed drive of claim 1 wherein said brake means comprises a plurality of friction disks alternately splined, respectively, to said output drive means and said stationary support means.

6. The two speed drive of claim 1 wherein said first engagement means comprises:

an annular collar extending from said output drive means for rotation therewith and disposed in coaxially spaced relation thereabout;

piston means slidably disposed in said collar and axially movable with respect to said collar; and pressure chamber means adjacent said piston means for selectively moving said piston means to engage said first clutch means and transmit rotation from said input drive means to said output drive means.

7. The two speed drive of claim 1 wherein said second engagement means comprises:

an annular collar extending from said output drive means for rotation therewith and disposed in coaxially spaced relation thereabout;

piston means slidably disposed on said collar and axially movable with respect to said collar; and pressure chamber means adjacent said piston means for selectively moving said piston means to engage said second clutch means and transmit rotation from said planetary gear means to said output drive means.

8. The two speed drive of claim 1 wherein said third engagement means comprises:

piston means slidably disposed in said support means and axially movable with respect to said support means; and pressure chamber means adjacent said piston means for selectively moving said piston means to release said brake means and allow rotation of said output means with respect to said stationary support.

9. A two speed drive for an apparatus comprising:

a stationary first support means for mounting said two speed drive;

a stationary second support means for mounting said two speed drive spaced apart from said stationary first support means;

input drive means for transmitting rotational movement into said two speed drive, said input drive means rotatably mounted on said first and second stationary support means;

output drive means for transmitting rotational movement from said two speed drive, said output drive means including a shaft rotatably mounted in said first and second stationary means, and an annular collar extending from said shaft for rotation therewith and disposed in coaxially spaced relation thereabout, said collar having first and second ends;

planetary gear means for providing speed reduction between said input drive means and said output drive means, said planetary gear means including a first sun gear fixedly attached to said stationary first support means, a plurality of planet gears rotatably mounted to a carrier, said planet gears meshed with said first sun gear, said carrier fixedly attached to said input drive means, and a second sun gear meshed with said plurality of planet gears for transmitting rotational movement to said output drive means;

selectively operable first clutch means for locking said output drive means to said input drive means, said first clutch means including a plurality of interleaved first friction disks alternately splined, respectively, to said collar and said input drive means, said first friction disks extending axially between said first and second ends of said collar;

selectively operable second clutch means for locking said output drive member to said second sun gear, said second clutch means including a plurality of interleaved second friction disks alternately splined, respectively, to said second sun gear and said collar, said second friction disks extending axially between said first and second ends of said collar;

said collar including first and second axially spaced stops, respectively proximate said first and second ends of said collar, said collar mounting said first clutch means inwardly of and in coaxial nested relation to said second clutch means;

first piston means slidably disposed in said collar adjacent the first end of said collar and axially movable towards said second stop adjacent to the second end of said collar;

first spring means for urging said first piston means into contact with said first friction disks and said first friction disks into compressed engagement with said second stop whereby to engage said first clutch means and lock said output drive means to said input drive means;

second piston means slidably disposed on said collar adjacent to said second end of said collar and axially movable towards said first stop adjacent to said first end of said collar;

second spring means for urging said second piston means into contact with said second friction disks and said second friction disks into compressed engagement with said first stop whereby to engage said second clutch means and lock said output shaft to said second sun gear;

actuating means connecting said first and second piston means together such that said first spring means cooperates with said second spring means to disengage both of said first and second clutch means;

first pressure chamber means adjacent said first piston means for selectively moving said second piston means against said second spring means to further disengage said second clutch means when said chamber is pressurized and substantially simultaneously moving said first piston means into contact with said first friction disks and said first friction disks into compressed engagement with said second stop whereby to engage said first clutch means and transmit rotation from said input drive means to said output drive means;

second pressure chamber means adjacent said second piston means for selectively moving said first piston means against said first spring means to further disengage said first clutch means when said chamber is pressurized and substantially simultaneously moving said second piston means into contact with said second friction disks and said second friction disks into compressed engagement with said first stop whereby said second clutch means and transmit rotation from said second sun gear to said output drive means;

selectively operable brake means for prohibiting rotation of said output drive means in relation to said first and second stationary support means, said brake means including a plurality of third friction disks alternately splined, respectively, to said output drive means and said stationary second support means, said third friction disks extending axially between said first and second ends;

third piston means for engaging said brake means, said third piston means slidably disposed in said stationary second support means adjacent the first end of said third disk members and axially movable towards said second end of said third disks members;

third spring means for urging said third piston means into contact with said third friction disks and said third friction disks into compressed engagement with said stationary second support means whereby to engage said brake means and prevent rotation of said output drive means;

third pressure chamber means adjacent said third piston means for selectively moving said third piston means against said third spring means to disengage said brake means when said chamber is pressurized.

* * * * *